Jan. 19, 1937.  W. A. HORBERG  2,068,326

CANDY DIPPING MACHINE

Filed Jan. 14, 1935  2 Sheets-Sheet 1

INVENTOR
William A. Horberg
by Fred W. Guibord
Atty

Jan. 19, 1937.  W. A. HORBERG  2,068,326
CANDY DIPPING MACHINE
Filed Jan. 14, 1935   2 Sheets-Sheet 2
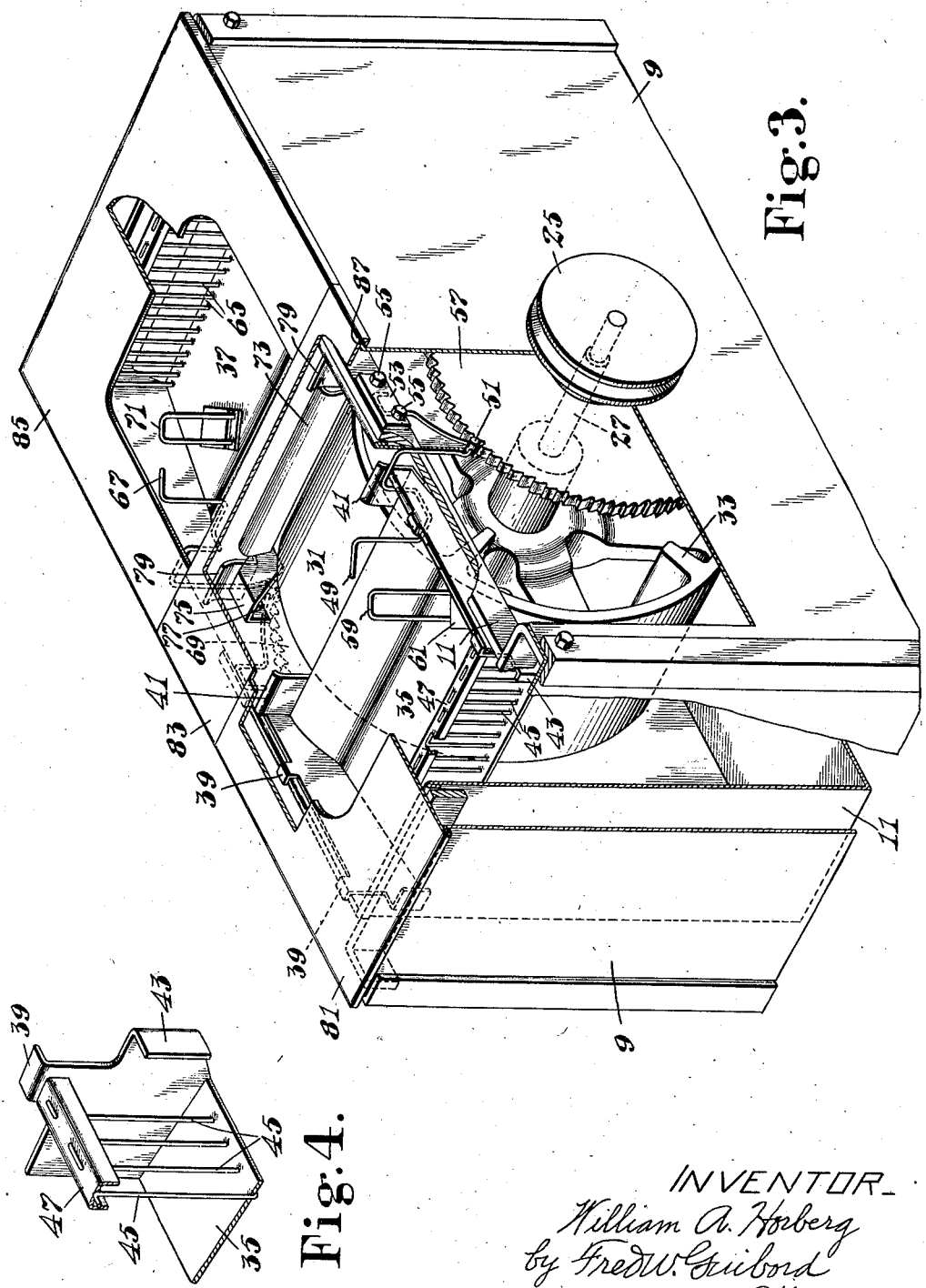
INVENTOR
William A. Horberg
by Fred W. Guibord
Atty Patented Jan. 19, 1937

2,068,326

UNITED STATES PATENT OFFICE 2,068,326

CANDY DIPPING MACHINE

William A. Horberg, Winchendon, Mass.

Application January 14, 1935, Serial No. 1,739

3 Claims. (Cl. 91—4)

This invention relates to machines for use in making candy and is herein illustrated as embodied in a fork dipping machine for coating candy centers with melted chocolate or other coating material.

The general object of the invention is to provide a small compact machine of simple but efficient construction in which the dipping pan is supplied continuously with melted coating material which has been thoroughly agitated. To this end, the illustrated machine comprises a heated kettle for melted coating material, a dipping pan through which coating material is caused to flow from the periphery of a combined feeding and agitating roller. And in order to facilitate removal of surplus coating material from centers which have been dipped, there is provided, overhanging the pan, a constantly actuated vibrator upon which the operator may at any time rest the dipping fork.

These and other features of the invention, including certain details of construction and combinations of parts, will be described as embodied in an illustrated machine and pointed out in the appended claims.

Figure 1:
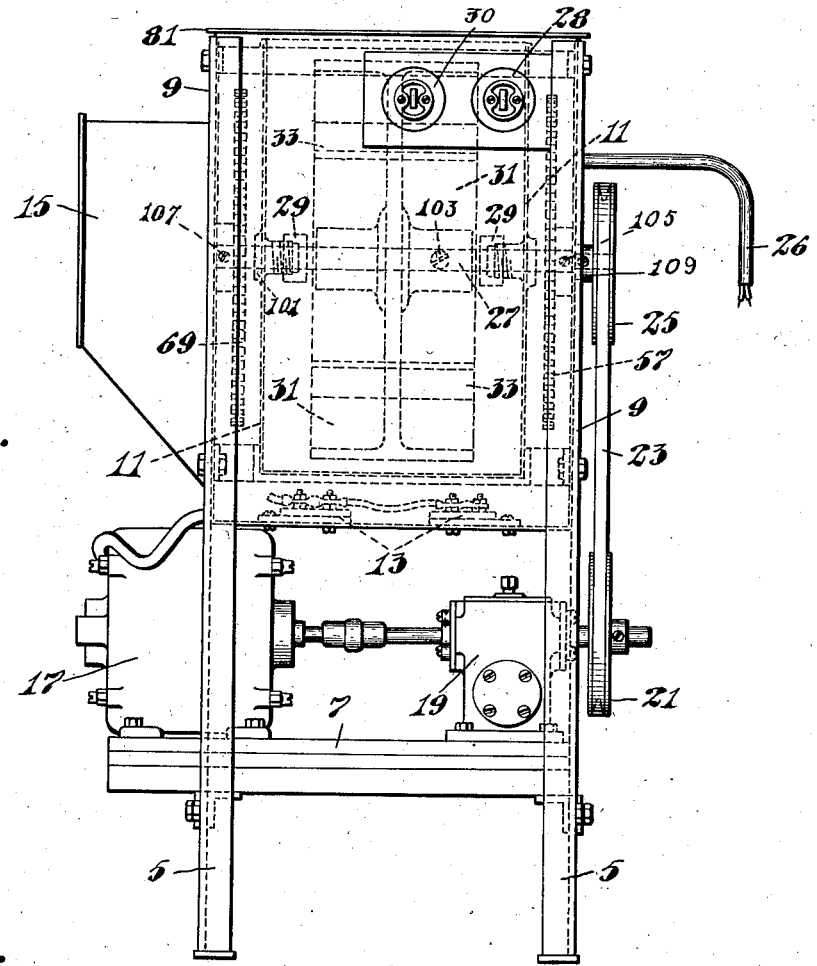
Figure 2:
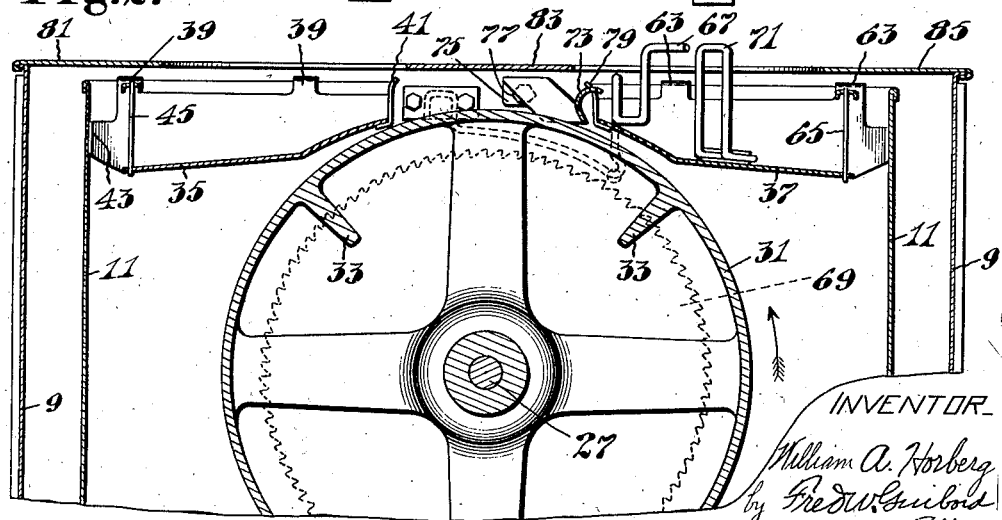

Referring to the accompanying drawings,

Figure 1 is an end elevation of a machine in which the present invention is embodied, Figure 2 is a vertical longitudinal section of a portion of the machine, Figure 3 is a perspective of a portion of the machine, and Figure 4 is a detail in perspective of a portion of the strainer construction of the rear walls of the dipping pans.

Referring first to Figures 1 and 2, the machine has legs 5 which support a shelf 7 and above the shelf a substantially rectangular container 9. Supported in the container is a kettle 11 for melted coating material, the sides and bottom of the kettle being spaced from the sides and bottom of the container to provide an air space between the kettle and the container. In the space between the bottom of the kettle and the bottom of the container are located electric heat units 13, and on one wall of the container is mounted a box 15 in which is located a thermostatic control mechanism, not shown, for governing the flow of current to the heat units in such manner as to maintain the melted coating material in the kettle at the desired temperature. On the shelf 7 is mounted an electric motor 17 and a box 19 containing a speed reduction gear mechanism through which a pulley 21 is driven by the motor. A belt 23 connects this pulley with a second pulley 25 fast to a horizontal shaft 27 which is rotatable in bearings carried by the walls of the kettle, suitable stuffing boxes 29 being provided to prevent leakage of the melted coating material. Any suitable motor, reduction gearing and thermostatic control may be employed. Current is led into the machine through the cable 26; and switches 28, 30 respectively control the flow of electricity to the motor and to the heat units.

Fast to the shaft 27 and located in the kettle is a combined feed member and agitator 31 comprising a cylindrical shell supported by spokes and having projecting inwardly from the shell a plurality of agitating paddles 33. Referring now more particularly to Figures 2 and 3, two dipping pans 35, 37 are located in the upper portion of the kettle one on each side of a vertical plane passed through the axis of the shaft 27; and inasmuch as the constructions of the two dipping pans are substantially identical, only one of them will be described in detail. The dipping pan 35 has a sloping bottom, solid side walls and a skeleton rear wall which acts as a strainer to catch any candy centers which may be accidentally dropped from the dipping fork into the pan. The pan is slightly narrower than the kettle and is suspended from the tops of the walls of the kettle by bent lugs 39 formed on the pan. The front or coating-receiving end of the pan is open, except for two narrow plates 41 which bridge the spaces between the ends of the roller 31 and the adjacent walls of the kettle to prevent centers which may have been accidentally dropped into the pan from falling through these spaces into the kettle. The rear end of the pan is spaced from the adjacent wall of the kettle by a bent lug 43; and the rear wall of the pan is a skeleton one (Fig. 4) formed principally of upright spaced runs 45 of a length of wire which has been drawn through properly spaced holes formed respectively in the bottom of the pan and in a cross-bar 47. The open front or receiving end of the pan faces the oncoming periphery of the roller 31 which rotates in the direction indicated by the arrow in Figure 2; and the edge of the bottom of the pan at its front end is located close to said periphery so that coating material is caused to flow directly from the periphery of the roller into the pan, over the bottom thereof and out through the skeleton rear wall back into the kettle. The roller 31 thus acts both to agitate the melted coating material by means of its paddles 33 and to feed coating material to the dipping pan.

After a candy center has been dipped by means of a dipping fork in the coating material in the pan, it is desirable to shake or vibrate the dipping fork in order to remove surplus coating material from the center. To this end, there is provided overhanging the pan a vibrator upon which the dipping fork may be rested. The vibrator takes the form of the horizontal end 49 of a wire of spring-steel which extends downward from the operative horizontal end, up over the side wall of the kettle, down to a sharp bend where a small stud 51 is mounted on it, and then up to a locality where its other end is clamped fast to the wall of the kettle by a small flat plate 53 and screw bolts 55. The small stud 51 is pressed down by the spring of the wire against the serrated periphery of a disk 57 over the teeth of which the stud drags when the disk is rotated to impart rapid vertical vibrations to the horizontal end 49 of the wire which overhangs the dipping pan. The toothed or serrated cam disk 57 is fast to the same shaft 27 which carries the feeding and agitating roller 31 and is located between one of the side walls of the container 9 and the adjacent side wall of the kettle 11. As an alternative to the vibrator 49, or in order to facilitate still further the removal of surplus coating material from a dipped center, a horizontal portion 59 of a bent stationary wire is provided against which the handle of the dipping fork may be struck. This second wire has its upper portion of inverted U-shape, the lower ends of the wire consisting of two horizontal bends which extend beneath a small plate 61 and are soldered to the plate and to the bottom of the dipping pan 35.

The other dipping pan 37 is substantially like the dipping pan 35. It is suspended by lugs 63 from the top of the kettle; its rear wall is a skeleton one comprising spaced upright portions 65 of a long bent wire; and over it extends a vibrator in the form of the horizontal end 67 of a bent wire of spring-steel which is mounted like the vibrator wire of the other dipping pan and is actuated by a second serrated disk 69 which, like the first serrated disk 57 is mounted on the shaft 27, said second disk being located in the space between a side wall of the container and the adjacent side wall of the kettle. The two serrated disks 57, 69 are thus located on opposite sides of the kettle 11. The pan 37, like the pan 35, also has soldered to its bottom and projecting above its top a stationary bent wire 71 against which the handle of the dipping fork may be struck. The dipping pan 37 has a substantially open front or receiving end, but the edge of the bottom of the pan at this end, while in proximity to the periphery of the feed roll 31, is not located as close to said periphery as is the front edge of the bottom of the pan 35. Instead, it is spaced somewhat from the periphery of the roller; and, in order to cause melted coating material to be fed into the pan 37, a curved baffle plate 73 extends along the front edge of the bottom of the pan 37, said baffle plate having bent ends, one of which is shown at 75, which are fastened by screw bolts to the side walls of the kettle 11, one of said screw bolts being shown at 77. The pan 37, like the pan 35, has two narrow spaced plates 79, corresponding to the plates 41 of the pan 35, which bridge the spaces between the ends of the roller 31 and the side walls of the kettle. Thus, with the construction which has been described, a certain amount of the melted coating material carried on the periphery of the roller 31 encounters the baffle plate 73 and flows into the pan 37, the rest of said coating material being carried beneath the baffle plate and delivered directly to the other pan 35.

In order to confine the heated air to the space between the walls of the container and those of the kettle, and to maintain warm air in contact with the bottoms and sides of the dipping pans, a cover, herein shown as made in three sections 81, 83 and 85, is provided, said sections being mounted for lengthwise sliding movement on the tops of the side walls of the container. As best shown in Figure 3, the tops of the side walls of the container 9 are bent outwardly at 87 to provide guides to enter grooves formed by reverse bends in the edges of the cover sections. The middle section 83 of the cover may be slid into position before one of the dipping pans is put in place. The end sections 81, 85 of the cover may be slid into and out of place at any time and are provided respectively, as best shown in Figure 3, with suitably shaped openings to expose the dipping pans. The ends of the end sections 81, 85 of the cover have reversely bent edges to form grooves in which are received narrow horizontally extending flanges at the tops of the end walls of the container 9.

In the operation of the machine the heating units are energized, the coating material is melted and poured into the kettle, the dipping pans and cover are put in place, and the motor is started. The rotating roller with its paddles agitates the coating material and feeds it continuously to the dipping pans. There is thus provided a simple, compact, comparatively inexpensive machine suitable for the use of small candy makers and capable of supplying coating material to two dipping operators.

It will be noted that the kettle 11 may be easily removed whenever it is desired to clean it or to change the coating material. To this end the shaft 27 (Fig. 1) is rotatably mounted in alined bearings 101 carried by opposite walls of the kettle 11, said bearings being provided with the stuffing boxes 29 mentioned above. The hub of the roll 31 is fastened to the shaft 27 by a set screw 103; and the hubs of the disks 57, 69 are fastened to the shaft by set screws 105, 107. Consequently, when these three set screws have been loosened and the belt removed from the pulley 25, the shaft 27 may be pulley out. When this has been done, the roll 31 and the disks 59, 67 may be removed, and the kettle lifted out of the container 9. A collar 109 fastened by a set screw to the right-hand end of the shaft 27 normally cooperates with the hub of the disk 57 to hold the shaft from longitudinal movement.

It has been stated above in describing the operation of the machine that the coating material is melted and poured into the kettle. It should be understood, however, that the melting may be done in the kettle if desired by breaking the coating material into small pieces, filling the kettle with them, turning on the heat and allowing the machine to stand for a suitable interval, for example over night, after which the motor may be started and the machine is ready for use.

Having thus described my invention, what I claim as new and desire to secure by Letters Patent of the United States is:

1. A dipping machine for use in coating candy centers comprising a kettle for melted coating material, a feed roller in the kettle with its lower portion submerged in the coating material, mechanism for rotating the roller, two open-front dipping pans located on opposite sides of a vertical plane passed through the axis of the roller, means for holding one of the dipping pans with its front end facing the on-coming periphery of the roller and with the front edge of the bottom of the pan so close to the periphery of the roller that coating material flows directly from the periphery of the roller into the pan, means for holding the other dipping pan with its front end facing the receding periphery of the roller and spaced farther from said periphery than is the front edge of the first-named pan, and means for directing a portion of the coating material carried on the periphery of the roller into the second pan.

2. A dipping machine for use in coating candy centers comprising a kettle for melted coating material, a feed roller in the kettle with its lower portion submerged in the coating material, mechanism for rotating the roller, two open-front dipping pans located on opposite sides of a vertical plane passed through the axis of the roller, means for holding one of the dipping pans with its front end facing the on-coming periphery of the roller and with the front edge of the bottom of the pan so close to the periphery of the roller that coating material flows directly from the periphery of the roller into the pan, means for holding the other dipping pan with its front end facing the receding periphery of the roller and spaced farther from said periphery than is the front edge of the first-named pan, and a baffle plate extending across the periphery of the roller adjacent to the edge of the bottom of the second-named pan for directing a portion of the coating material carried by the roller into said second-named pan.

3. A dipping machine for use in coating candy centers, comprising a kettle for melted coating material, a feed roller in the kettle with its lower portion submerged in the coating material, mechanism for rotating the roller, an open-front dipping pan with its front end facing the receding periphery of the roller, and a baffle plate so located between the periphery of the roller and the front end of the dipping pan that coating material carried on the periphery of said roller is directed into the dipping pan.

WILLIAM A. HORBERG.